United States Patent
Tanaka et al.

(10) Patent No.: US 7,263,420 B2
(45) Date of Patent: Aug. 28, 2007

(54) VEHICLE BACKWARD MOVEMENT ASSIST DEVICE AND VEHICLE PARKING ASSIST DEVICE

(75) Inventors: Yuu Tanaka, Aichi-ken (JP); Yoshifumi Iwata, Anjo (JP); Hisashi Satonaka, Susono (JP); Tomohiko Endo, Toyota (JP); Yuichi Kubota, Okazaki (JP); Akira Matsui, Toyota (JP); Hideyuki Iwakiri, Tajimi (JP); Toru Sugiyama, Toyota (JP); Seiji Kawakami, Susono (JP); Katsuhiko Iwazaki, Shizuoka-ken (JP); Hiroaki Kataoka, Susono (JP)

(73) Assignees: Aisin Seiko Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 411 days.

(21) Appl. No.: 10/927,051

(22) Filed: Aug. 27, 2004

(65) Prior Publication Data

US 2005/0049766 A1    Mar. 3, 2005

(30) Foreign Application Priority Data

Aug. 28, 2003   (JP)   ............................. 2003-304102

(51) Int. Cl.
*G06F 17/00*   (2006.01)
(52) U.S. Cl. ....................................................... 701/36
(58) Field of Classification Search .................. 701/36
See application file for complete search history.

(56) References Cited

U.S. PATENT DOCUMENTS 6,170,591 B1 * 1/2001 Sakai et al. .................. 180/204
6,487,481 B2    11/2002 Tanaka et al.
2004/0119610 A1 * 6/2004 Maemura et al. ........ 340/932.2

FOREIGN PATENT DOCUMENTS

| EP | 1 170 172 A2 | 1/2002 |
| EP | 1 308 346 A2 | 5/2003 |
| EP | 1 332 948 A1 | 8/2003 |
| EP | 1 473 212 A2 | 11/2004 |
| EP | 1 510 442 A2 | 3/2005 |
| JP | 11-208420 A2 | 8/1999 |
| JP | 2001-341600 A | 12/2001 |
| JP | 2003-081041 A | 3/2003 |
| JP | 2001-322493 A | 7/2003 |
| JP | 2003-212073 A | 7/2003 |

* cited by examiner

*Primary Examiner*—Thu V. Nguyen
(74) *Attorney, Agent, or Firm*—Sughrue Mion, PLLC

(57) ABSTRACT

A vehicle backward movement assist device includes an image capturing means for capturing an image of an outside area in back of a vehicle, a parking mode judging means for judging whether a parking mode by reversing of the vehicle is a back-in parking or a parallel parking, a target parking position inputting means for setting a target parking position where the vehicle is parked based on the parking mode determined by the parking mode judging means, and a displaying means for displaying the image captured by the image capturing means and superimposedly displaying the target parking position set by the target parking position inputting means on the captured image so as to guide the vehicle to the target parking position.

11 Claims, 14 Drawing Sheets

VEHICLE BACKWARD MOVEMENT ASSIST DEVICE AND VEHICLE PARKING ASSIST DEVICE

CROSS REFERENCE TO RELATED APPLICATIONS

This application is based on and claims priority under 35 U.S.C. § 119 to Japanese Patent Application 2003-304102, filed on Aug. 28, 2003, the entire content of which is incorporated herein by reference.

FIELD OF THE INVENTION

This invention generally relates to a vehicle backward movement assist device. More particularly, the invention pertains to a vehicle parking assist device for assisting a driving operation for a back-in parking and a parallel parking.

BACKGROUND

It is relatively difficult for an inexperienced driver to park a vehicle, i.e. to perform a back-in parking and a parallel parking. Therefore, a parking assist device is known to be provided for assisting the driving operation for parking. JP11(1999)-208420A2 discloses such a parking assist device. According to the disclosed parking assist device, a target parking area is captured by a camera mounted on a side of the vehicle and displayed on a display. Then, a target parking position obtained by calculation is superimposedly displayed on the captured image of the target parking area for guiding the vehicle to the target parking position.

According to the disclosed parking assist device, a specified single method is constantly used for both the back-in parking and the parallel parking, i.e. even if a parking mode for the target parking position is different. Thus, it may be difficult to move the target parking position on the display. Especially in the back-in parking, the target parking position is required to be adjusted in three axes, i.e. a longitudinal direction, a vertical direction and a rotational angle. In case of a parking frame (target parking position) on the display for the parallel parking, the rotational angle is not necessarily adjusted. In addition, the operation direction may not match with a sensibility of human being.

Thus, a need exists for a vehicle backward movement assist device and vehicle parking assist device that can be operated matching with sensibility of a driver in accordance with a parking mode such as a back-in parking and a parallel parking, and achieve a simple operation for moving a target parking position.

SUMMARY OF THE INVENTION

According to an aspect of the present invention, a vehicle backward movement assist device includes an image capturing means for capturing an image of an outside area in back of a vehicle, a parking mode judging means for judging whether a parking mode by reversing of the vehicle is a back-in parking or a parallel parking, a target parking position inputting means for setting a target parking position where the vehicle is parked based on the parking mode determined by the parking mode judging means, and a displaying means for displaying the image captured by the image capturing means and superimposedly displaying the target parking position set by the target parking position inputting means on the captured image so as to guide the vehicle to the target parking position.

According to another aspect of the present invention, a vehicle backward movement assist device includes an image capturing means for capturing an image of an outside area in back of a vehicle, a parking mode judging means for judging whether a parking mode by reversing of the vehicle is a back-in parking or a parallel parking, a target parking position inputting means for setting a target parking position where the vehicle is parked based on the parking mode determined by the parking mode judging means, a target parking position storing means including one or more storage areas for a target parking position information for storing the target parking position in a selected storage area and for selectively calling the stored target parking position to set as the target parking position at that time, and a displaying means for displaying the image captured by the image capturing means and superimposedly displaying the target parking position set by the target parking position inputting means or the target parking position storing means on the captured image so as to guide the vehicle to the target parking position.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is explained referring to attached drawings.

Figure 1:
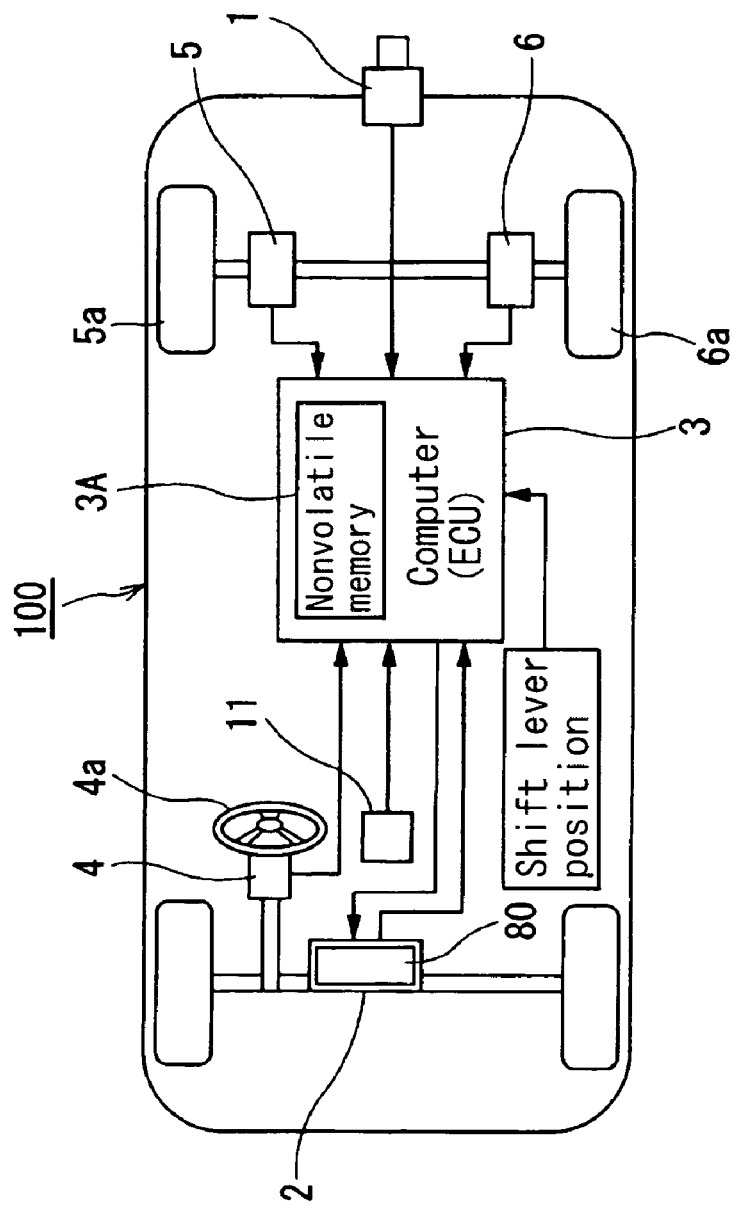
FIG. 1 is a system schematic view of an overall structure of a vehicle equipped with a parking assist device according to an embodiment of the present invention.
Figure 2:
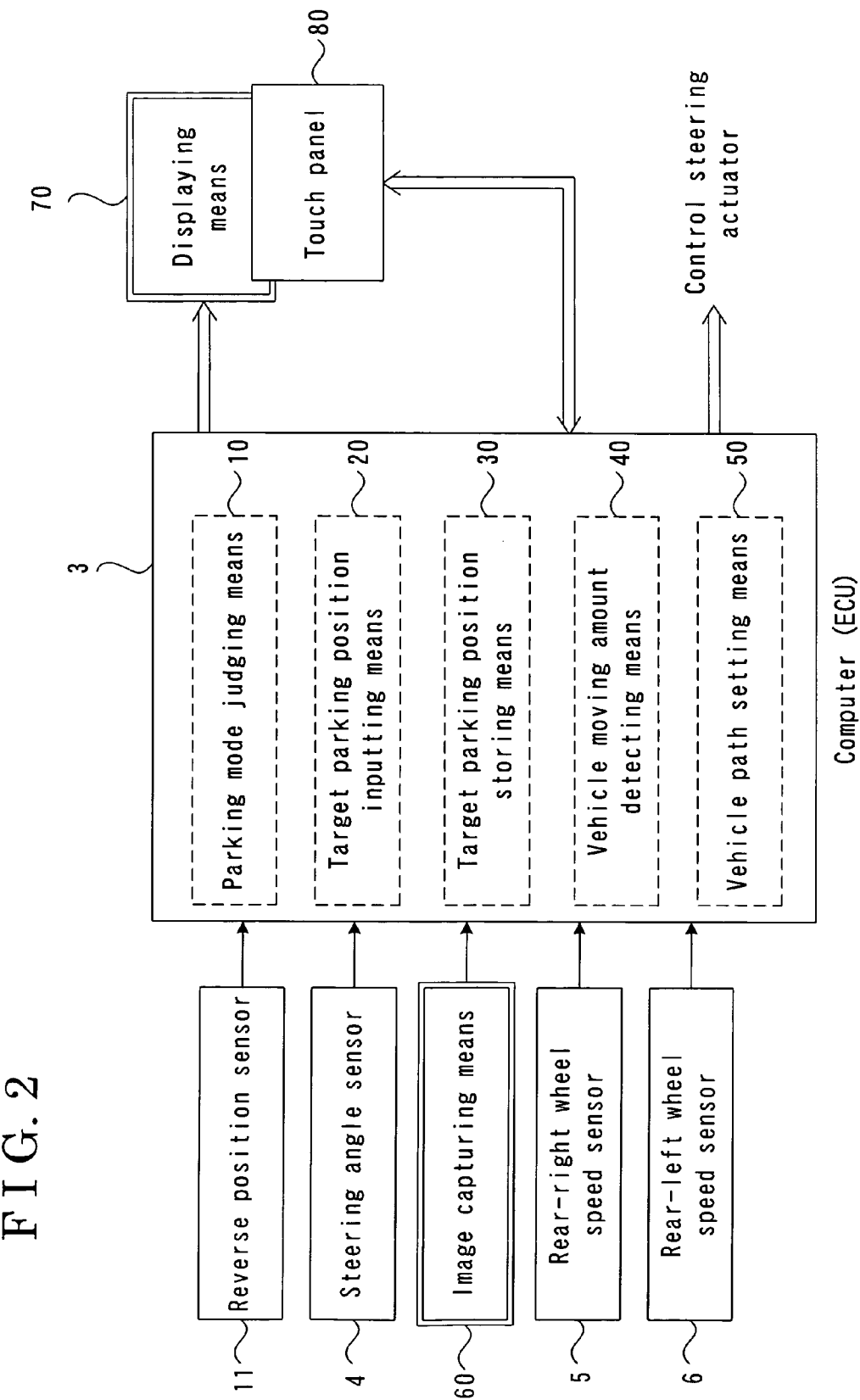
FIG. 2 is a block diagram of a computer of the vehicle equipped with the parking assist device according to the embodiment of the present invention.
Figure 3:
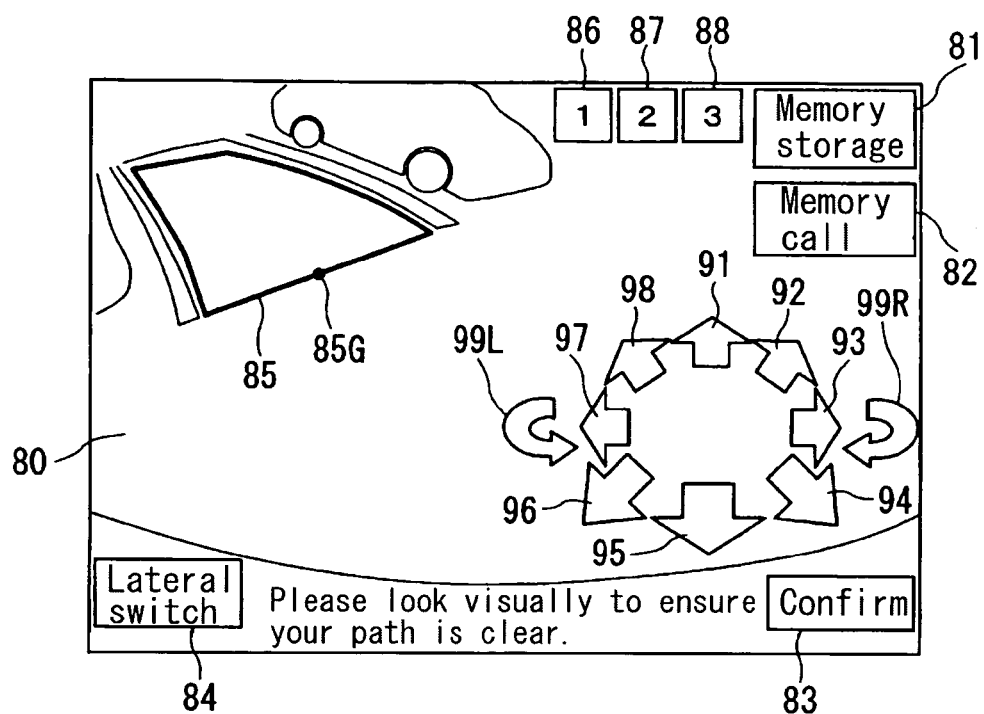
FIG. 3 is an explanatory view of a display and a touch panel of the parking assist device according to the embodiment of the present invention.

FIG. 1 is a system schematic view of an overall structure of a vehicle equipped with a parking assist device according to the present embodiment. FIG. 2 is a block diagram showing a functional structure of a computer of the vehicle equipped with the parking assist device according to the present embodiment. FIG. 3 is an explanatory view of a display and a touch panel of the parking assist device according to the present embodiment.

As shown in FIG. 1, a CCD camera 1 (hereinafter called camera) attached to a rear portion of a vehicle 100 constitutes an image capturing means 60 for capturing an image of an outside area in back of the vehicle 100. The image captured by the camera 1 is directly displayed on a display 2 through a signal processing as the image being regarded as a known image signal. In addition a parking position information on which the signal processing is performed by a computer (ECU) 3 is displayed on the display 2 in addition to the image captured by the camera 1. The display 2 constitutes a displaying means 70 together with a calculation function of the computer 3.

A steering angle sensor 4 detects a rotational angle of a steering wheel 4a. A rear-right wheel speed sensor 5 provided at a rear-right wheel 5a and a rear-left wheel speed sensor 6 provided at a rear-left wheel 6a detect a vehicle moving distance, a present status of the vehicle 100, and an estimated position of the vehicle 100 moving afterwards. The steering angle sensor 4, the rear-right wheel speed sensor 5, the rear-left wheel speed sensor 6, and the calculation function of the computer 3 constitute a vehicle moving amount detecting means 40 for detecting a moving amount of the vehicle 100 of the present embodiment. In addition, the steering angle sensor 4 and the calculation function of the computer 3 constitute a parking mode judging means 10 for determining that the parallel parking is being conducted when a deflection angle of a running path of the vehicle 100 is equal to or smaller than a predetermined threshold value within a predetermined distance or a predetermined time immediately before a shift lever (not shown) is positioned in a reverse range.

That is, the parking mode judging means 10 determines whether a change of the steering angle from the vehicle running state before the predetermined distance or the predetermined time to a state in which the shift lever is positioned in the reverse range is large to be considered as the parallel parking being performed or small to be considered as the back-in parking being performed. According to the parking mode judging means 10, the steering angle is constantly stored per predetermined running distance or predetermined time. Then, the back-in parking or the parallel parking is determined based on a maximum change amount of the steering angle within a predetermined running distance or a predetermined time. At this time, it is preferable to use a shift register for the steering angle sensor 4 and a storing means for sequentially storing the steering angle per predetermined running distance or predetermined time that can sequentially delete information produced before a predetermined distance or predetermined time.

A target parking position confirming key 83 serving as a touch key is arranged at a bottom right portion of a transparent touch panel 8 that is provided, overlapping on a surface of the display 2 provided at an instrument panel. According to the present embodiment, the touch panel 80 is integrally formed with the display 2 arranged in the vicinity of a driver seat of the vehicle 100. However, the display 2 and the touch panel 80 may be separately formed. The target parking position confirming key 83 on the touch panel 80 is pressed when a target position in a parking space and the like where the vehicle 100 is backed up is determined. The target parking position confirming key 83 constitutes a target parking position inputting means 20 together with the calculation function of the computer 3. The touch panel 80 may be replaced by an independent stick, a touch key, a button-type switch and the like.

As shown in FIG. 3, the touch panel 80 includes an area for the target parking position confirming key 83 at the right bottom portion. In addition, a lateral switching key 84 serving as the touch key is arranged at a left bottom portion of the touch panel 80 for repeatedly switching a target parking position 85 between a left upper portion and a right upper portion. The target parking position 85 is obtained by converting a target parking position on the plane into an image captured by the camera 1.

The touch panel 80 includes an upward indicator 91 for moving the target parking position 85 in an upward direction on a screen of the display 2, a rightward indicator 93 for moving the target parking position 85 in a rightward direction, a downward indicator 95 for moving the target parking position 85 in a downward direction, and a leftward indicator 97 for moving the target parking position 85 in a leftward direction, all serving as the touch key, at a right corner where the image of the target parking position 85 is not displayed and thus not interfered by the above keys. Further, the touch panel 80 includes an upper-rightward indicator 92 for moving the target parking position 85 in an upper rightward direction, a bottom-rightward indicator 94 for moving the target parking position 85 in a bottom rightward direction, a bottom-leftward indicator 96 for moving the target parking position 85 in a bottom leftward direction, and an upper-leftward indicator 98 for moving the target parking position 85 in an upper leftward direction that are respectively and alternately arranged between the upward indicator 91, the rightward indicator 93, the downward indicator 95, and the leftward indicator 97.

Further, the touch panel 80 includes a rightward rotation (clockwise) indicator 99R and a leftward rotation (counterclockwise) indicator 99L. Whenever the rightward rotation indicator 99R is continuously pressed, the target parking position 85 is rotated by 1 degree per 1 second of pressing in the rightward direction with respect to a base point 85G provided at a front center of the image of the target parking position 85. In addition, whenever the rightward rotation indicator 99R is intermittently pressed, the target parking position 85 is rotated by 15 degrees per pressing in the rightward direction with respect to the base point 85G. In the same way, whenever the leftward rotation indicator 99L is continuously pressed, the target parking position 85 is rotated by 1 degree per 1 second of pressing in the leftward direction with respect to the base point 85G. Whenever the leftward rotation indicator 99L is intermittently pressed, the target parking position 85 is rotated by 15 degrees per pressing in the leftward direction with respect to the base point 85G. According to the present embodiment, the base point 85G is provided at the front center of the image of the target parking position 85. However, the base point 85G may be provided at a center, a rear center, or each corner of the image of the target parking position 85.

The target parking position confirming key 83, the upward indicator 91, the rightward indicator 93, the downward indicator 95, the leftward indicator 97, the rightward rotation indicator 99R and the leftward rotation indicator 99L are at least pressed when the target parking position where the vehicle 100 is parked is set and also constitute a target parking position inputting means 20 together with the calculation function of the computer 3.

The touch panel 80 includes a memory storage key 81 at a right top corner and a memory call key 82 immediately below the memory storage key 81 both serving as the touch key. In addition, the touch panel 80 includes three memory selection keys 86, 87 and 88 at desired three portions each for storing the target parking position 85. In case of memory writing, one of the three memory selection keys 86, 87 and 88 is selectively pressed and then the memory storage key 81 is pressed. The writing of the target parking position 85 shown on the display 2 at that time is completed accordingly. In case of memory calling, one of the three memory selection keys 86, 87 and 88 is selectively pressed and then the memory call key 82 is pressed. The calling of the target parking position 85 stored in the corresponding memory selection key 86, 87 or 88 is completed accordingly.

The memory storage key 81 and the memory call key 82 are provided on the touch panel 80 as shown in FIG. 3, corresponding to a predetermined memory area of a nonvolatile memory 3A incorporated in the computer 3. In addition, the memory storage key 81, the memory call key 82, and the three memory selection keys 86, 87, and 88 are provided on the touch panel 80, corresponding to a predetermined memory area of the nonvolatile memory 3A incorporated in the computer 3. Then the target parking position 85 is written into a predetermined area of the nonvolatile memory 3A when one of the memory selection keys 86, 87, and 88 is selectively pressed and the memory storage key 81 is pressed. Meanwhile, the target parking position 85 stored in a predetermined area of the nonvolatile memory 3A is called when one of the memory selection keys 86, 87, and 88 is selectively pressed and the memory call key 82 is pressed. The called target parking position 85 is set to be used for the calculation. The memory selection keys 86, 87 and 88, the memory storage key 81, the memory call key 82 and the nonvolatile memory 3A constitutes a target parking position storing means 30 that includes a memory storage area for a plurality of target parking position 85 for storing the target parking position 85 by selecting the corresponding memory storage area and selectively calling the stored target parking position 85.

A reverse position sensor 11 is a sensor for detecting a position of a known shift lever and more precisely, detecting whether or not the shift lever or a transmission is in a reverse rage.

The computer 3 includes the parking mode judging means 10, the target parking position inputting means 20, the target parking position storing means 30, the vehicle moving amount detecting means 40, and a vehicle path setting means 50. The parking mode judging means 10 determines whether the parking mode is the back-in parking or the parallel parking based on the deflection angle of the vehicle running path detected by the steering angle sensor 4 per predetermined distance or predetermined time immediately before the shift lever is brought in a reverse range. When the aforementioned deflection angle is equal to or smaller than a predetermined threshold value, the parking mode is determined to be the parallel parking. The target parking position inputting means 20 sets the target parking position to which the vehicle 100 is parked based on the parking mode determined by the parking mode judging means 10. The target parking position storing means 30 stores the target parking position 85 and also calls the stored target parking position 85 to set for the vehicle path setting means 50. The vehicle moving amount detecting means 40 detects the movement of the vehicle 100 together with the steering angle sensor 4, the rear-right wheel speed sensor 5 and the rear-left wheel speed sensor 6. The vehicle path setting means 50 calculates a vehicle path from a present position of the vehicle 100 detected by the vehicle moving amount detecting means 40 to the target parking position. The computer 3 also includes a feature for displaying the image captured by the camera 1 on the display 2 and superimposedly displaying the vehicle path from the present position of the vehicle 100 calculated by the vehicle path setting means 50 to the target parking position on the captured image on the display 2 based on the target parking position set by the target parking position inputting means 20 or the target parking position storing means 30.

An operation of the parking assist device according to the present embodiment is explained referring to a flowchart and an operation explanatory view.

Figure 4A:
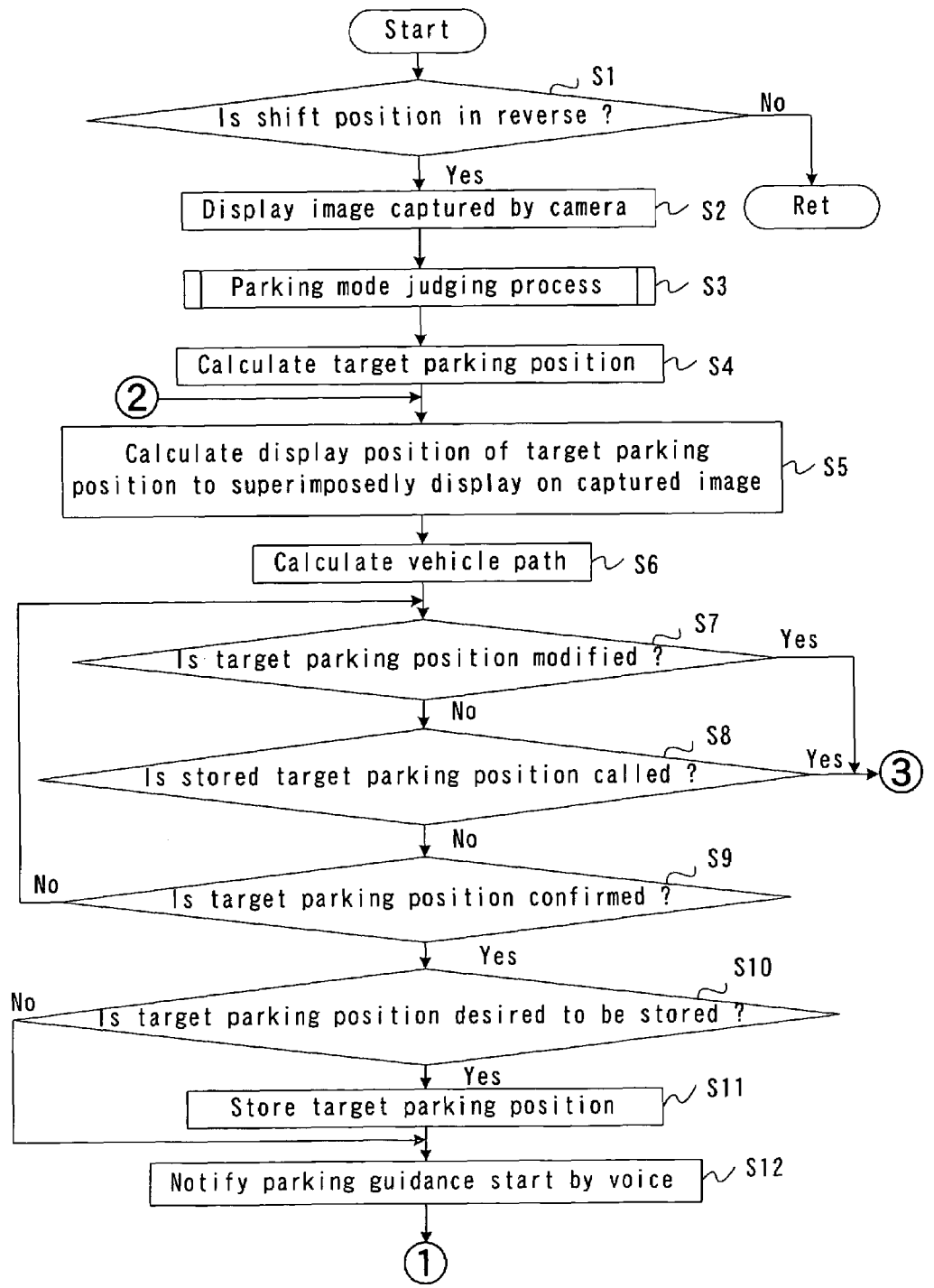
FIG. 4A is a part of a flowchart for controlling the parking assist device according to the embodiment of the present invention.
Figure 4B:
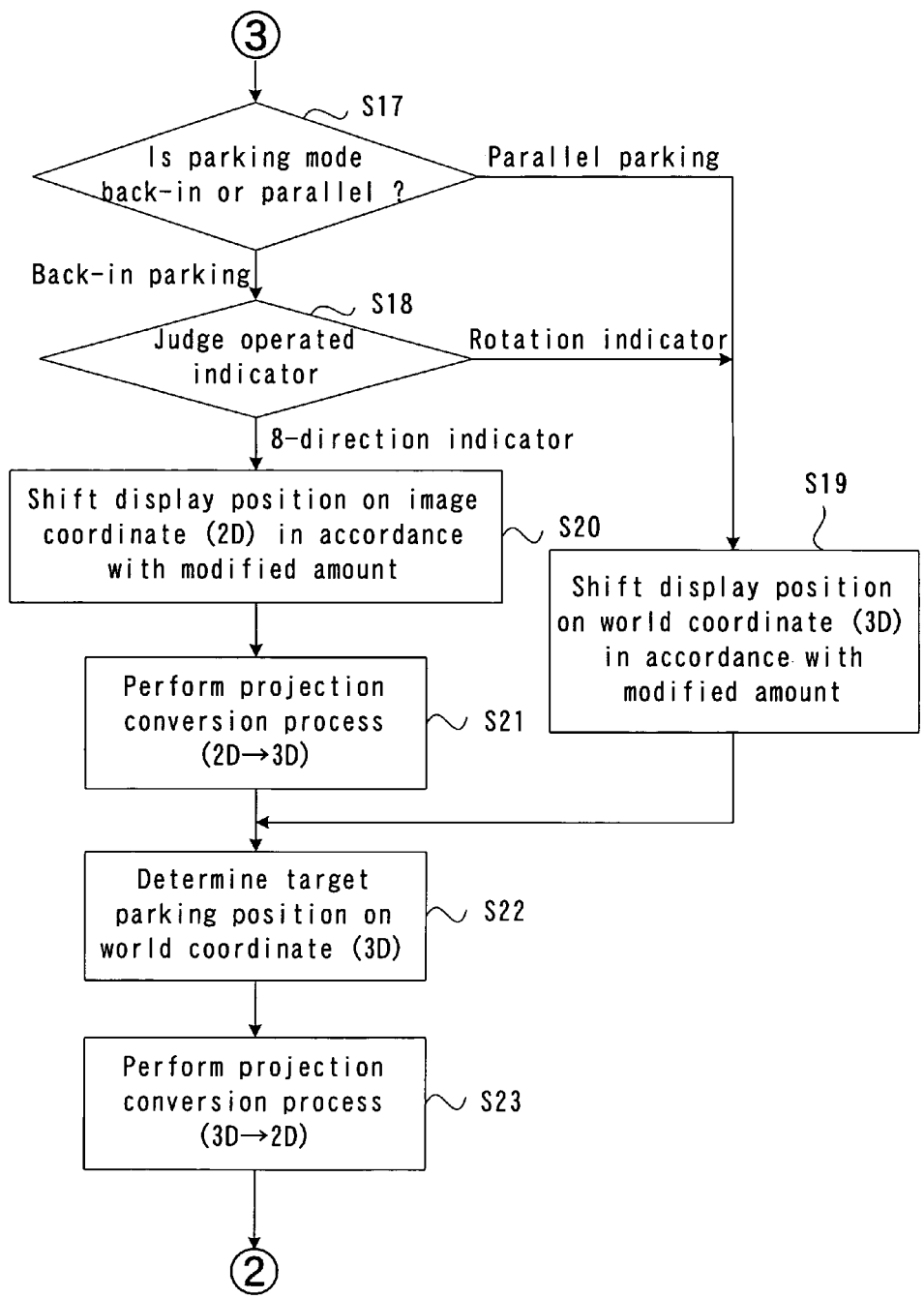
FIG. 4B is also a part of the flowchart for controlling the parking assist device according to the embodiment of the present invention.
Figure 5:
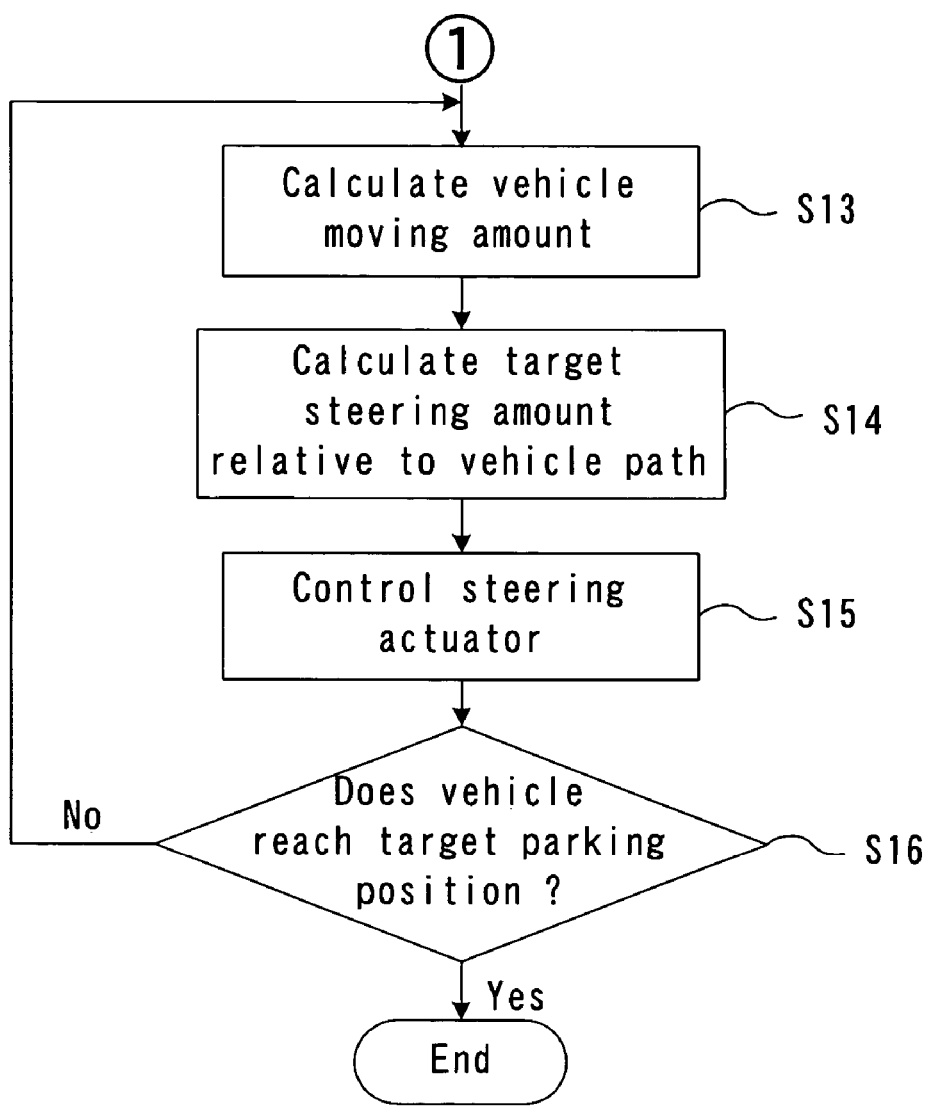
FIG. 5 is also a part of the flowchart for controlling the parking assist device according to the embodiment of the present invention.
Figure 6:
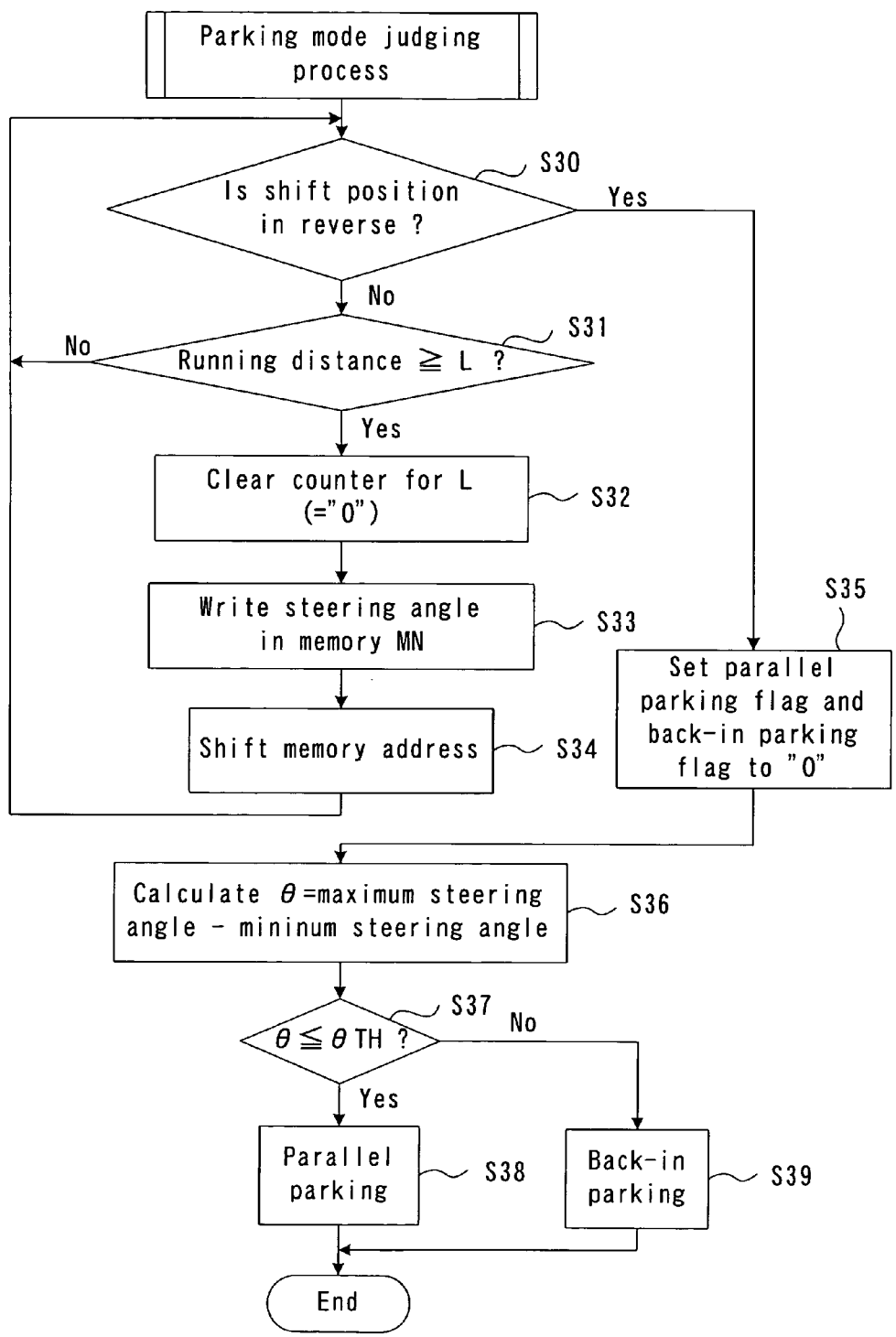
FIG. 6 is a flowchart of a routine for a parking mode judging process of the parking assist device according to the embodiment of the present invention.
Figure 7:
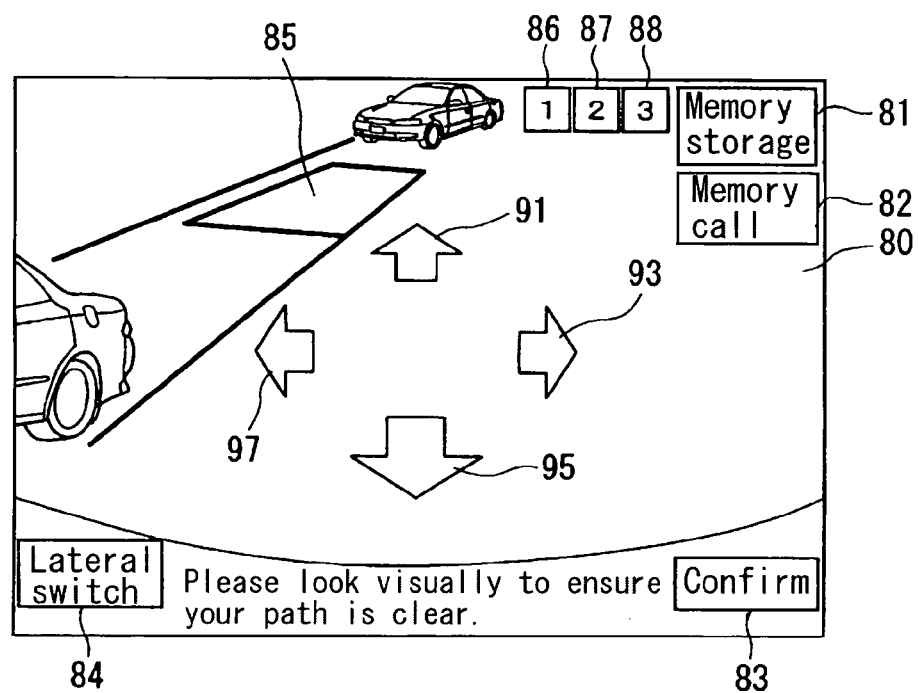
FIG. 7 is an explanatory view of a selection screen for a parallel-parking of the parking assist device according to the embodiment of the present invention.
Figure 8:
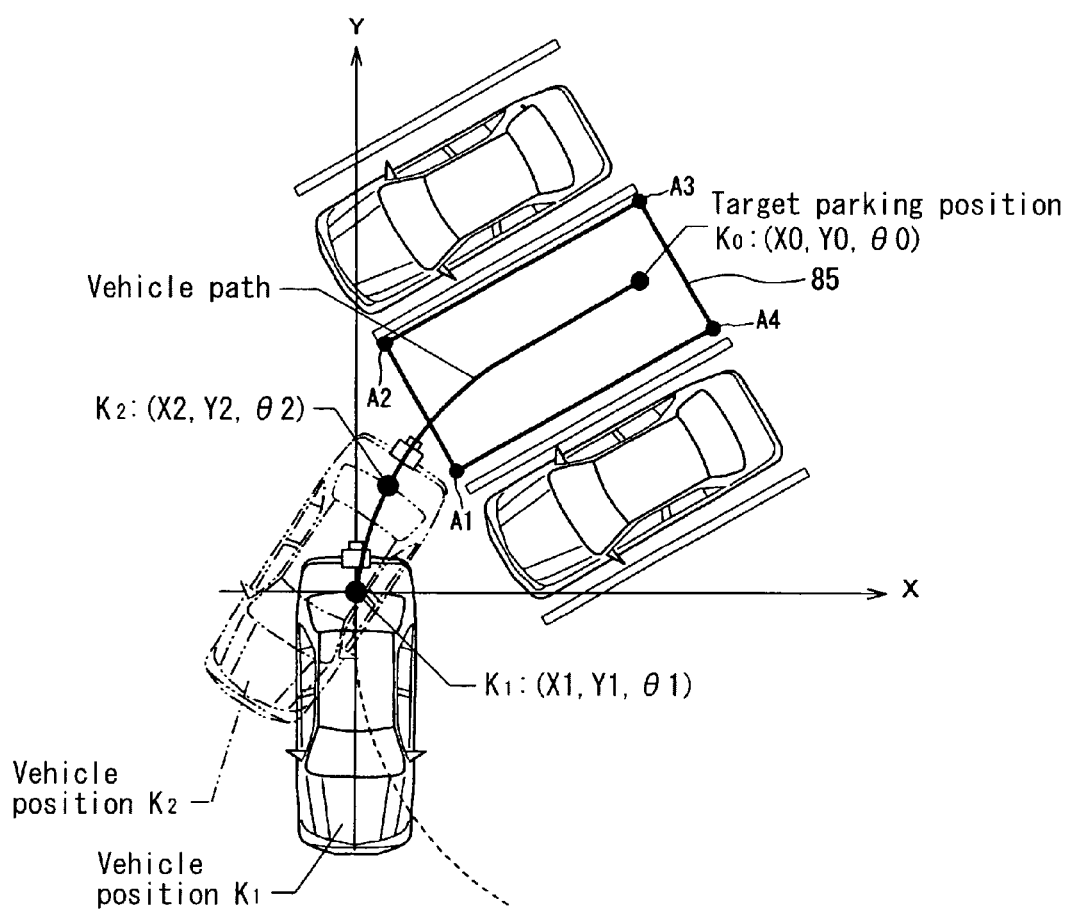
FIG. 8 is an explanatory view of a relationship between a garage (example of a back-in parking) and the vehicle according to the embodiment of the present invention.
Figure 9:
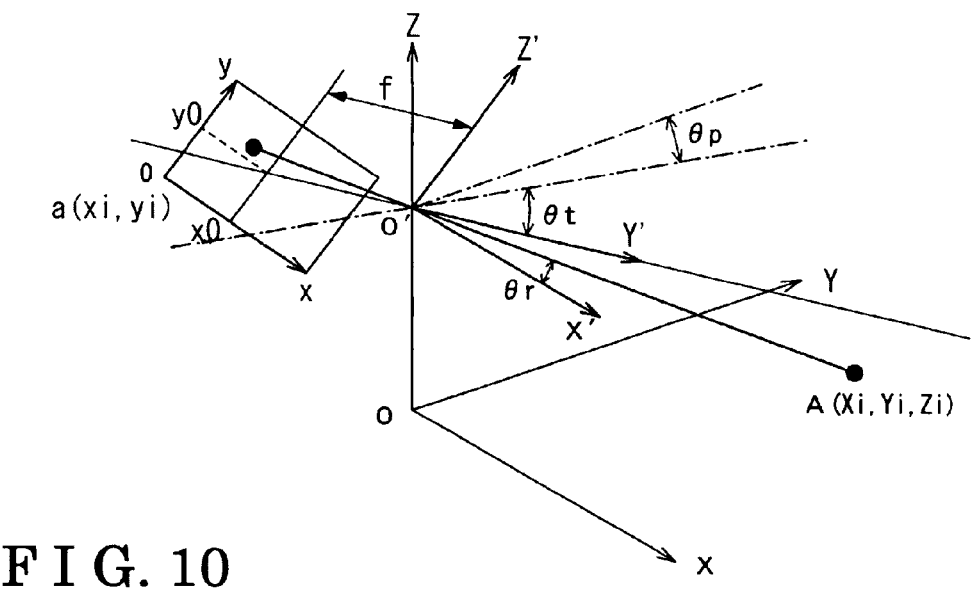
FIG. 9 is an explanatory view of a coordinate system conversion of the parking assist apparatus according to the embodiment of the present invention.
Figure 10:
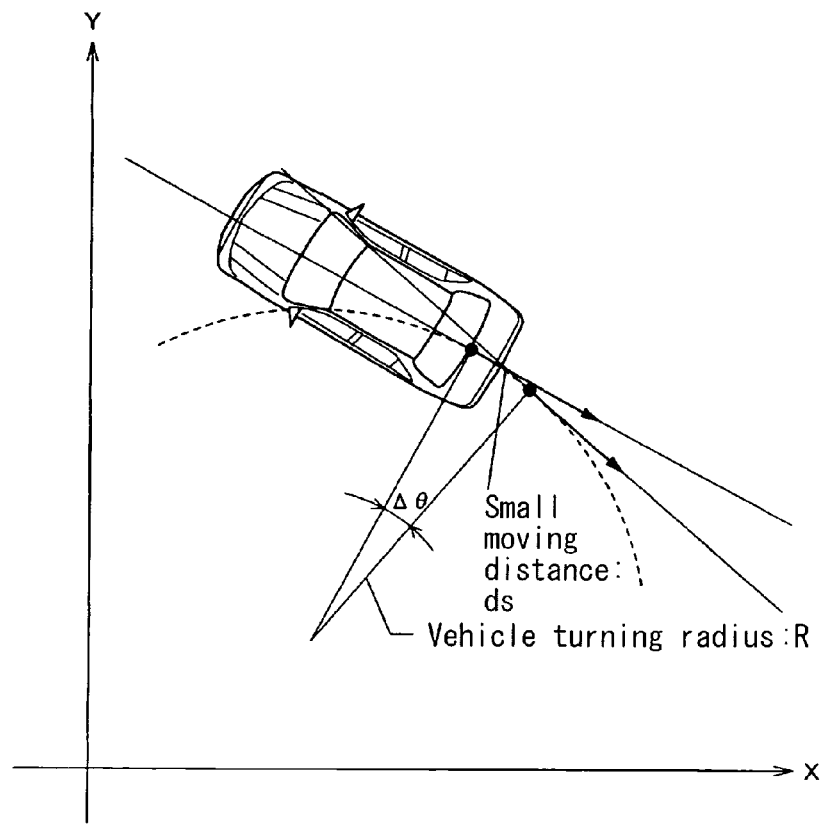
FIG. 10 is an explanatory view showing a movement of the vehicle when a target parking position is set according to the embodiment of the present invention.

FIGS. 4 and 5 are flowcharts for a control operation of the parking assist device according to the present embodiment. FIG. 6 is a flowchart for the parking mode judging process of the parking assist device according to the present embodiment. FIG. 7 is an explanatory view of a selection screen for the parallel parking of the parking assist device according to the present embodiment. FIG. 8 is an explanatory view of a relationship between a garage (an example of the back-in parking) and the vehicle according to the present embodiment. FIG. 9 is an explanatory view of coordinate system conversion of the parking assist device according to the present embodiment. FIG. 10 is an explanatory view showing the movement of the vehicle when the target parking position is set according to the present embodiment.

Figure 11:
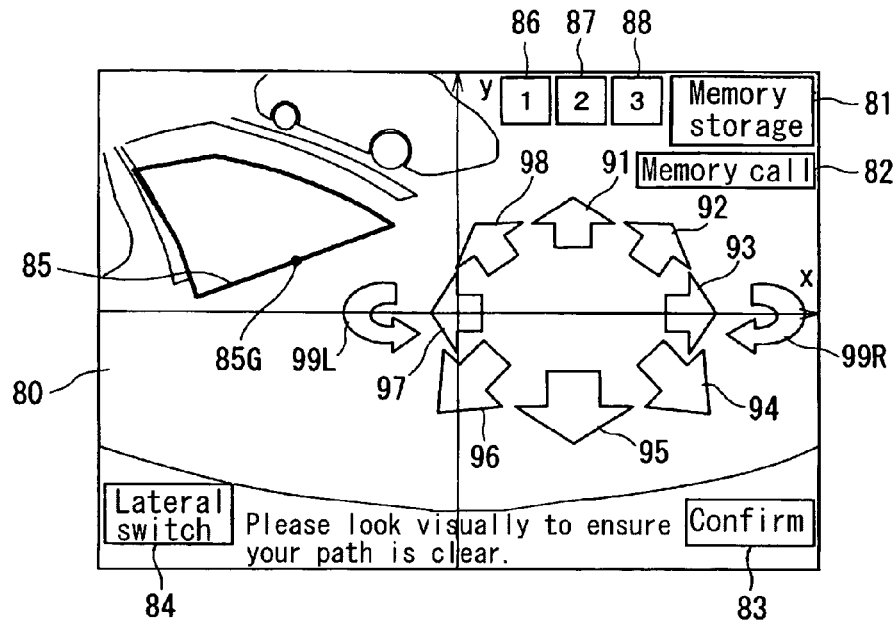
FIG. 11 is an explanatory view of an image example of the target parking position on the display and the touch panel before the target parking position is corrected in a predetermined direction in case that the back-in parking is performed according to the embodiment of the present invention.
Figure 12:
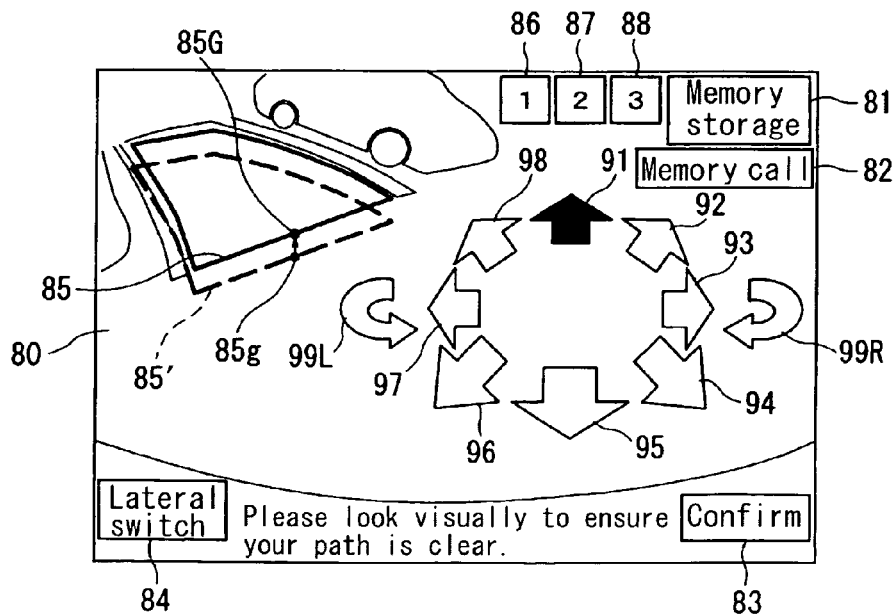
FIG. 12 is an explanatory view of the image example of the target parking position on the display and the touch panel after the target parking position is corrected in the predetermined direction in case that the back-in parking is performed according to the embodiment of the present invention.
Figure 13:
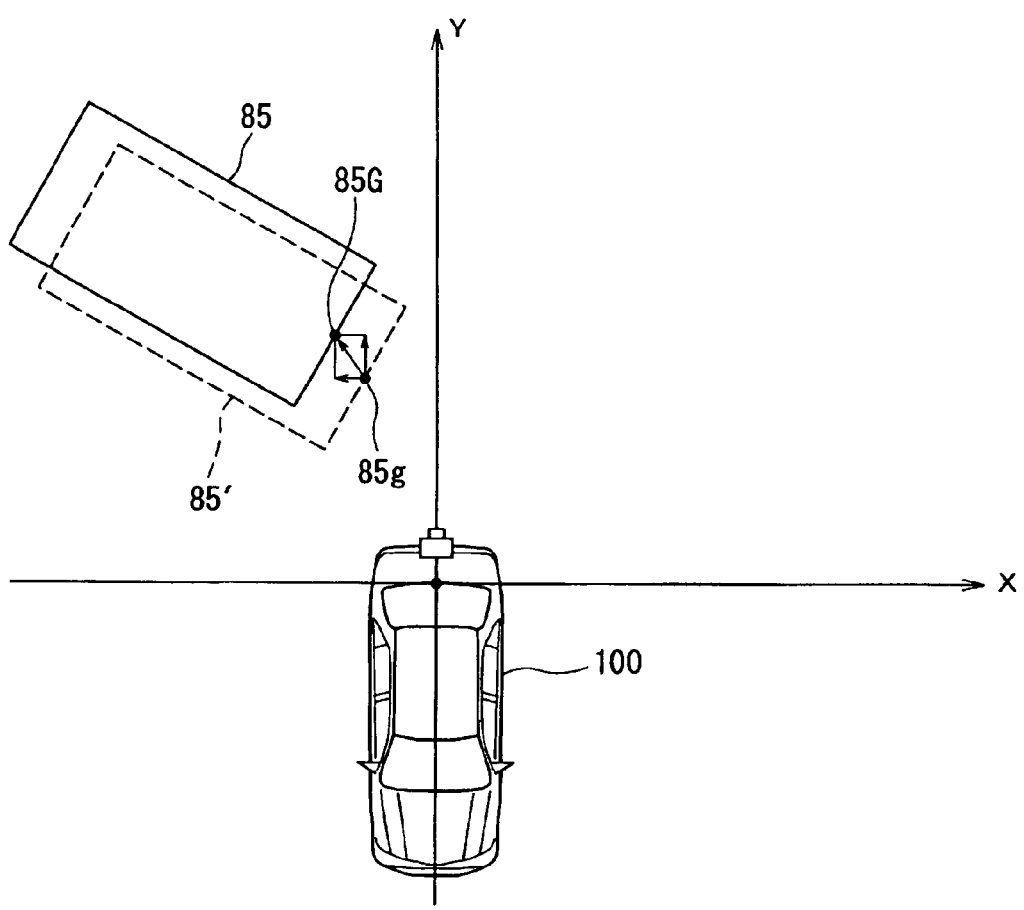
FIG. 13 is a plane view for explaining the image example of FIGS. 11 and 12 to be corrected in the predetermined direction in case that the back-in parking is performed according to the embodiment of the present invention.
Figure 14:
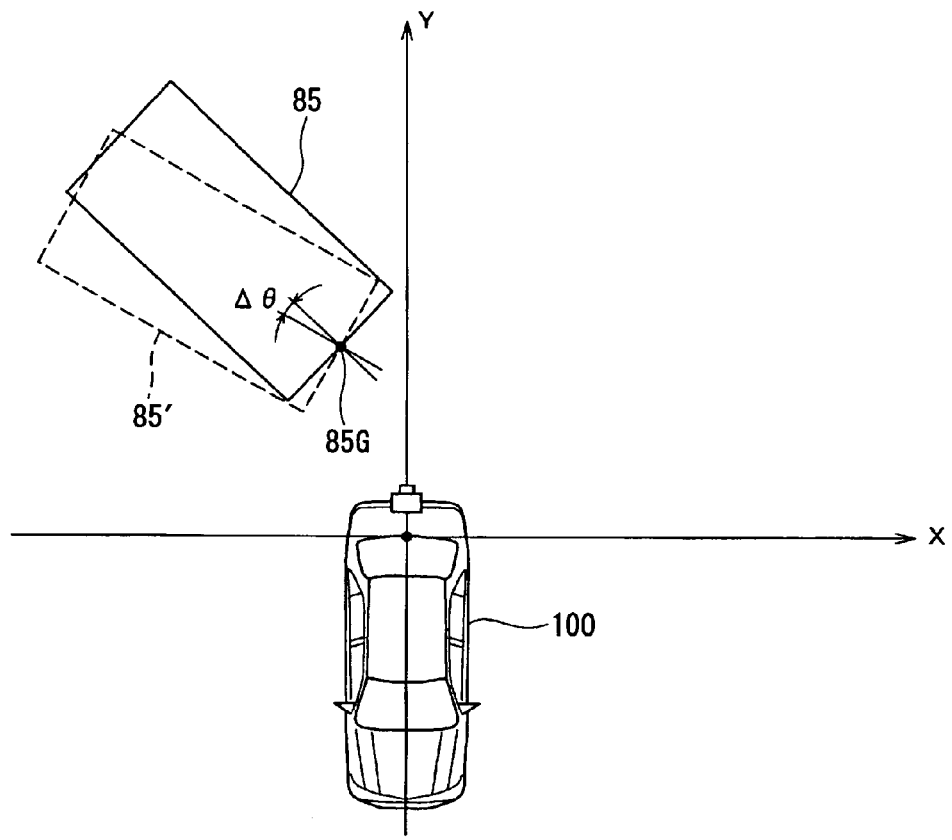
FIG. 14 is a plane view for explaining the image example of the target parking position to be rotationally corrected in case that the back-in parking is performed according to the embodiment of the present invention.
Figure 15:
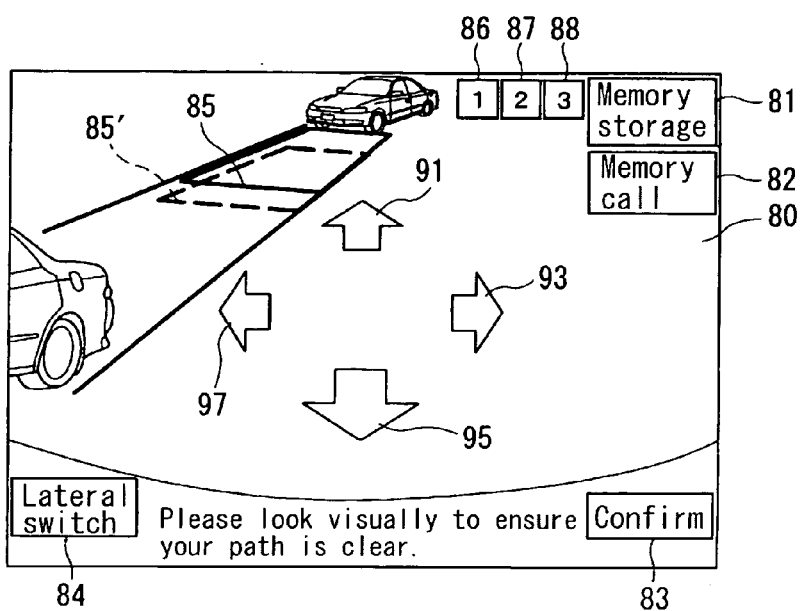
FIG. 15 is an explanatory view of the image example of the target parking position on the display and the touch panel after the target parking position is corrected in a predetermined direction in case that the parallel parking is performed according to the embodiment of the present invention.
Figure 16:
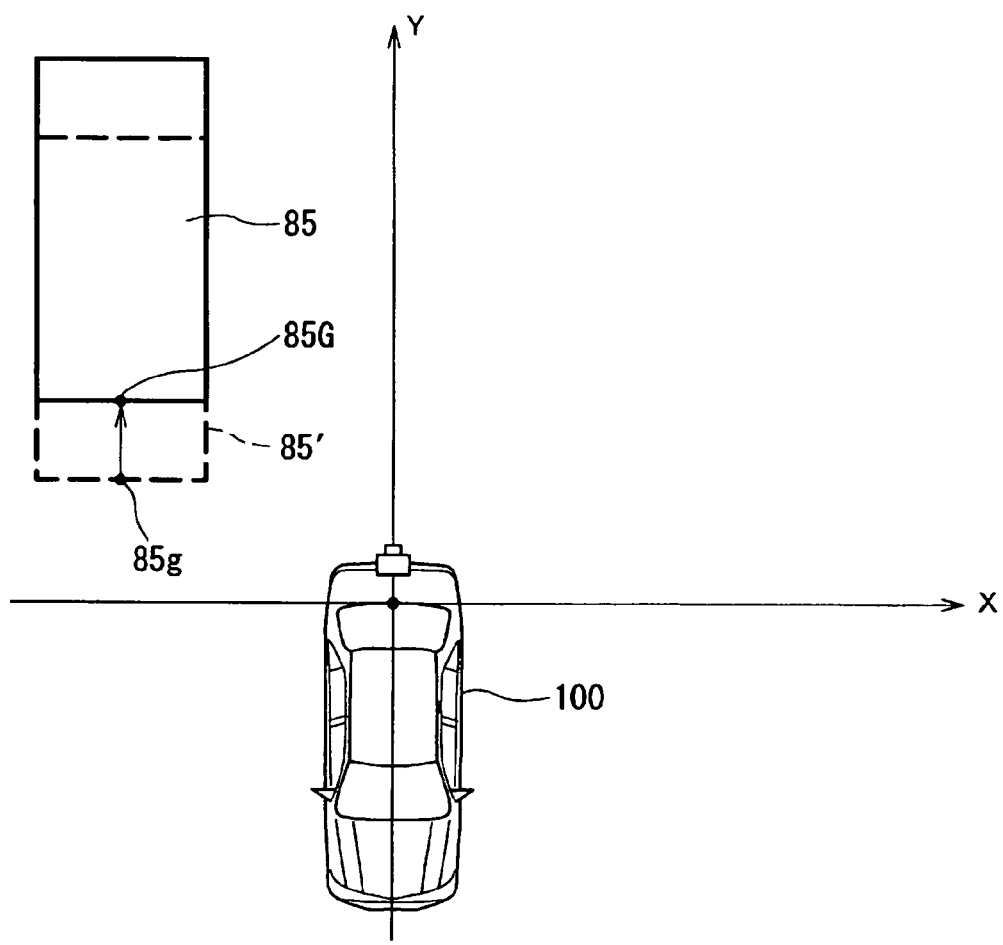
FIG. 16 is a plane view for explaining the image example of FIG. 15 to be corrected in the predetermined direction in case that the parallel parking is performed according to the embodiment of the present invention.

Further, FIG. 11 is an explanatory view of an image example of the target parking position on the display and the touch panel before the target parking position is corrected in a predetermined direction in case that the back-in parking is performed. FIG. 12 is an explanatory view of the image example of the target parking position on the display and the touch panel after the target parking position is corrected in the predetermined direction in case that the back-in parking is performed. FIG. 13 is a plane view for explaining the image example of FIGS. 11 and 12 to be corrected in the predetermined direction in case that the back-in parking is performed. FIG. 14 is a plane view for explaining the image example of the target parking position to be rotationally corrected in case that the back-in parking is performed. FIG. 15 is an explanatory view of the image example of the target parking position on the display and the touch panel after the target parking position is corrected in a predetermined direction in case that the parallel parking is performed. FIG. 16 is a plane view for explaining the image example of FIG. 15 to be corrected in the predetermined direction in case that the parallel parking is performed.

In the flowcharts of a routine of FIGS. 4 to 6, first, a position of the shift lever is detected by the reverse position sensor 11 in S1. When the shift lever is not in the reverse range, this routine is not started and the other process is to be conducted. When it is determined that the shift lever is in the reverse range in S1, the process of this routine is initiated. In S2, the camera 1 is driven to capture the image of an area in back of the vehicle 100, which is output and displayed on the display 2 that is also driven at the same time.

In S3, a routine of parking mode judging process is called. The routine of parking mode judging process is always performed independently. As shown in FIG. 6, the position of the shift lever is detected by the reverse position sensor 11 in S30. When the shift lever is not in the reverse range, the routine from S30 to S34 is repeatedly performed. Precisely, when it is determined that the shift lever is not in the reverse range in S30, then it is determined whether or not a vehicle running distance is equal to or greater than a predetermined running distance L in S31. In case that the running distance L is not reached or exceeded, the process waits to proceed in S30 until the running distance L is reached or exceeded. When it is confirmed that the running distance L is reached or exceeded in S31, a counter for counting the running distance L is cleared in S32. In S33, a steering angle at that time is written in an address of memory MN (N indicates a total number of memory storage areas existing). Then, a steering angle in the memory storage area of memory M1 is cleared and each address of N number of memory storage areas is shifted to each address of N-1. That is, the oldest steering angle information is deleted after shifting of N number of memory storage areas. Normally, the running distance L is approximately set between 0.3 and 1.5 m, and number of memory storage areas is approximately set between 10 and 15. However, the running distance L and the number of memory storage areas may not be limited to the above values.

When it is determined that the shift lever is in the reverse range in S30, the routine from S35 to S39 is performed. First, when it is confirmed that the shift lever is in the reverse range, then a parallel parking flag indicating that the parking mode of the vehicle is the parallel parking is set to "0" in S35. At the same time, a back-in parking flag for indicating that the parking mode of the vehicle is the back-in parking is set to "0". Then, in S36, a difference between a maximum steering angle and a minimum steering angle in N number of memory storage areas is calculated for estimating a deflection angle $\theta$ of a predetermined running path of the vehicle immediately before the shift lever is put in the reverse range. At this time, the rightward rotation and the leftward rotation of the steering angle with respect to a center position thereof are defined as positive and negative respectively. That is, the positive and negative are designated based on the steering angle in the rightward direction and the leftward direction. In S37, it is determined whether or not the deflection angle $\theta$ is equal to or smaller than a predetermined threshold value $\theta TH$. When it is determined that the deflection angle $\theta$ is equal to or smaller than the predetermined threshold value $\theta TH$, the parking mode is determined as the parallel parking in S38. The parallel parking flag is set to "1" accordingly. Meanwhile, when it is determined that the deflection angle $\theta$ is greater than the predetermined threshold value $\theta TH$, then the parking mode is determined as the back-in parking in S39. The back-in parking flag is set to "1". According to the present routine, whether the reverse movement of the vehicle is for the parallel parking or the back-in parking is determined when the shift lever is put in the reverse range.

According to the present embodiment, addressing is conducted per running distance L for writing the steering angle in the memory MN. That is, the steering angle is stored per predetermined distance. The steering angle may be stored per predetermined time. However, storing the steering angle per predetermined distance may improve reliability since the back-in parking or the parallel parking is determined based on the distance.

In S4, the target parking position 85 is calculated based on the parking mode determined according to the parking mode judging process in S3, i.e. the back-in parking or the parallel parking. The target parking position 85 primarily set to an initial value with high probability is most likely to be displayed on the left corner or the right corner of the image on the display 2. Alternatively, the target parking position 85 may be determined by learning from a past back-in parking or the parallel parking habit of the driver.

In S5, the target parking position 85 is shown on a two-dimensional coordinate represented by a plane coordinate (X-axis and Y-axis). It is required that target parking position 85 is regarded as the image captured by the camera 1 arranged at a predetermined height position (Z-axis) of the vehicle 100 and whose image representation should be same as that of the image captured by the camera 1 so as to be the image of the display 2. Based on the result obtained by the routine in S3, the display of FIG. 3 for the back-in parking or the display of FIG. 7 for the parallel parking is implemented accordingly.

The image shown on the display 2 is processed as follows.

As shown in FIG. 8 of an example of the back-in parking, a length of the parking space is defined as A1 to A4 and A2 to A3, and a width of the parking space is defined as A1 to A2 and A4 to A3 on the two-dimensional coordinate as a space where the vehicle 100 can be parked based on a size of the vehicle 100. At this time, a target parking position K0 is defined as X0, Y0, $\theta 0$ on the two-dimensional coordinate. A specified K position of the vehicle 100 to be ultimately matched with the target parking position K0 (X0, Y0, $\theta 0$) is on a point of K1 (X1, Y1, $\theta 1$) on the two-dimensional coordinate. When the vehicle 100 reverses, the K position of the vehicle 100 is changed to K2 (X2, Y2, $\theta 2$) on the two-dimensional coordinate. During this time, the vehicle path is repeatedly calculated. The aforementioned status also applies in case of the parallel parking.

According to the representation of the two-dimensional coordinate, it is known that the image captured by the camera 1 is represented on the two-dimensional screen as the image of the display 2 (X-axis and Y-axis). In this case, as shown in FIG. 8, the back-in parking is performed by perceiving a relationship between the parking space and the vehicle 100 on the two-dimensional coordinate. However, the two-dimensional screen of the display 2 is the image captured by the camera 1 arranged at the predetermined height position (Z-axis) of the vehicle 100. Thus, the position is actually determined on a three-dimensional world coordinate system (X-axis, Y-axis and Z-axis) showing the information of the place where the vehicle 100 is to be parked.

For example, an A point (Xi, Yi, Zi) on the ground as a point on the world coordinate system as shown in FIG. 9 is calculated as follows when converted to an a point (xi, yi) on an image coordinate.

$$a = P \begin{bmatrix} A \\ 1 \end{bmatrix}$$ Equation 1

$$P = C \begin{bmatrix} R \\ T \end{bmatrix}$$ Equation 2

In the equation 1, P represents a conversion matrix of 3×4 projection corresponding to the display 2. C represents an internal parameter of the camera 1. R represents a rotational movement, and T represents a parallel movement. A light axis of lens (center line) of the camera 1 is positioned on a center of the image coordinate (x0, y0) of the display 2. Then, when the world coordinate system is positioned by matching with Y'-axis direction of the coordinate of the three-dimensional space (X'-axis, Y'-axis, Z'-axis), Y'-axis direction may be ignored.

The display of the target parking position on the world coordinate system is converted to a point on the image coordinate according to the aforementioned equations 1 and 2. Then, the target parking position is superimposedly displayed as a graphic image on the image captured by the camera 1.

That is, in S5, the target parking position 85 as the calculated result in S4 is added on the image captured by the camera 1 and displayed on the display 2 as the image thereof.

In S6, the present position of the vehicle 100 captured by the camera 1 is determined on the two-dimensional coordinate. The actual vehicle path to the target parking position 85 is then calculated.

In S7, it is determined whether the target parking position 85 calculated in S4 is modified via the upward indicator 91, the upper-rightward indicator 92, the rightward indicator 93, the bottom-rightward indicator 94, the downward indicator 95, the bottom-leftward indicator 96, the leftward indicator 97, and the upper-leftward indicator 98, or via the rightward rotation indicator 99R and the leftward rotation indicator 99L in case of the necessity of changing the target parking position 85. In addition, in S8, it is determined whether or not the stored target parking position 85 is called and set as an actual target parking position based on whether or not the memory call key 82 arranged at the upper right portion of the touch panel 80 is pressed. In S9, it is determined whether or not the driver presses the target parking position confirming key 83 arranged at the lower right portion of the touch panel 80 as the present target parking position 85 is not required to be modified.

When the target parking position 85 is modified in S7 or the stored target parking position 85 is called via the pressing on the memory call key 82, the process proceeds to S17 since the target parking position 85 is required to be changed. On the contrary, when the target parking position confirming key 83 is pressed, the process proceeds to S10.

Precisely, when the modification of the target parking position 85 is required and it is determined that any of the upward indicator 91, the upper-rightward indicator 92, the rightward indicator 93, the bottom-rightward indicator 94, the downward indicator 95, the bottom-leftward indicator 96, the leftward indicator 97, the upper-leftward indicator 98, the rightward rotation indicator 99R and the leftward rotation indicator 99L are pressed in S7, the process proceeds to S17. In addition, when any one of three memory selection keys 86, 87 and 88 arranged at the right upper portion of the touch panel 80 and the memory call key 82 are pressed and thus the stored target parking position 85 is called in S8, the process also proceeds to S17.

In the routine from S1 to S9, the back-in parking or the parallel parking is identified and then, the vehicle 100 side, i.e. the background image captured by the camera 1 can be moved on the display 2 while the image of the target parking position 85 or the image of the target parking position 85 called by pressing the memory call key 82 is remained on the display 2. In the routine after S17, the position change of the image of the target parking position 85 is performed on the display 2 as being mentioned later.

In S17, it is determined whether the parking mode is the back-in parking or the parallel parking based on the result of the routine of the parking mode judging process in S3, and the target parking position 85 called by pressing any one of the memory selection keys 86, 87 and 88 and the memory call key 82.

That is, when the back-in parking is determined as the parking mode in S17, then it is determined whether any of the upward indicator 91, the upper-rightward indicator 92, the rightward indicator 93, the bottom-rightward indicator 94, the downward indicator 95, the bottom-leftward indicator 96, the leftward indicator 97, and the upper-leftward indicator 98 (i.e. 8-direction indicator) are pressed or any of the rightward rotation indicator 99R and the leftward rotation indicator 99L (i.e. rotation indicator) are pressed in S18. When it is determined that any of the upward indicator 91, the upper-rightward indicator 92, the rightward indicator 93, the bottom-rightward indicator 94, the downward indicator 95, the bottom-leftward indicator 96, the leftward indicator 97 are pressed, the process proceeds to S20.

Whereas, when it is determined that any of the rightward rotation indicator 99R and the leftward rotation indicator 99L are pressed, the process proceeds to S19.

In S19, i.e. when the parallel parking is determined as the parking mode in S17 by the routine of the parking mode judging process in S3, or when the back-in parking is determined as the parking mode in S17 by the routine of the parking mode judging process in S3 and then the target parking position is modified via the rotation indicator in S18, the A point (Xi, Yi, Zi) on the ground in FIG. 9 is shifted on the world coordinate system in accordance with the modified amount of the target parking position 85.

When it is determined that any of the upward indicator 91, the upper-rightward indicator 92, the rightward indicator 93, the bottom-rightward indicator 94, the downward indicator 95, the bottom-leftward indicator 96, and the leftward indicator 97 are pressed in S18, the display of the target parking position 85 is shifted on the image coordinate in accordance with the modified amount of the target parking position 85 in S20. Then, in S21, the display of the shifted target parking position 85 on the image coordinate is converted to that on the world coordinate system, thereby obtaining the target parking position 85 on the world coordinate system.

In S22, the movement of the target parking position 85 on the display 2 on the image coordinate is set as the actual target parking position of the vehicle 100 on the world coordinate system. Further, the target parking position on the world coordinate system is converted to the image of the display 2 on the image coordinate in S23. Then, each routine from S5 to S9, and from S17 to S23, is repeated. According to the routine from S17 to S23, the position of the image of the target parking position 85 on the display 2 can be changed.

As explained in the process from S17 to S23, when the back-in parking is determined and the target parking position 85 is moved in parallel (i.e. the target parking position 85 is moved via any of the upward indicator 91, the upper-rightward indicator 92, the rightward indicator 93, the bottom-rightward indicator 94, the downward indicator 95, the bottom-leftward indicator 96, and the leftward indicator 97, and the upper-leftward indicator 98), the target parking position 85 is moved on the image coordinate system. Meanwhile, when the parallel parking is determined, the target parking position 85 is moved on the world coordinate system. Thus, the target parking position 85 can be adjusted on the display 2, meeting with sensibility of the user. In this case, the aforementioned movement in parallel is a linear movement that the target parking position 85 is moved without changing a direction of the vehicle 100 (on the world coordinate system) that the target parking position 85 constitutes.

That is, when it is determined that the parking mode is the back-in parking, the upward indicator 91, the upper-rightward indicator 92, the rightward indicator 93, the bottom-rightward indicator 94, the downward indicator 95, the bottom-leftward indicator 96, and the leftward indicator 97, and the upper-leftward indicator 98 for parallel movement is provided for moving the target parking position 85 in a single coordinate axis direction (any one of upward direction on Y-axis, upper-rightward direction on X-Y axis plane, upward direction on X-axis, lower-rightward direction on X-Y axis plane, lower direction on Y-axis, lower-leftward direction on X-Y axis plane, leftward direction on X-axis, and upper-leftward direction on X-Y axis plane on the display 2 in FIG. 11) of the coordinate axes constituting the image coordinate system (X-axis and Y-axis in FIG. 11).

Whereas, when it is determined that the parking mode is the parallel parking, the upward indicator 91, the rightward indicator 93, the downward indicator 95, and the leftward indicator 97 for parallel movement are provided for moving the target parking position 85 in a single coordinate axis direction (any one of upward direction on Y-axis, rightward direction on X-axis, downward direction on Y-axis, and leftward direction on X-axis in FIG. 16) of the coordinate axes constituting the world coordinate system (X-axis and Y-axis in FIG. 16). Thus, the target parking position 85 can be adjusted on the display 2, meeting with the sensibility of the user.

When the setting of the target parking position 85 on the image of the display 2 is completed after repeatedly performing the routine from S5 to S9 and from S17 to S23, the driver confirms that the target parking position 85 is determined and then presses the target parking position confirming key 83. When it is determined that the target parking position confirming key 83 arranged at the lower right portion of the touch panel 80 is pressed in S9, and then it is determined that one of the memory selection keys 86, 87, 88 and the memory storage key 81 are pressed in S10, the target parking position 85 is stored in the selected memory selection key 86, 87 or 88. At this time, the back-in parking flag or the parallel parking flag for indicating that the parking mode is the back-in parking or the parallel parking is stored.

The back-in parking flag and the parallel parking flag are not necessarily stored since the information of the back-in parking and the parallel parking is stored via the image. However, each flag is used for the determination in S17 and S18 according to the present embodiment.

Then, when it is determined that the target parking position 85 at that time is required to be stored based on the pressing on the memory storage key 81 of the touch panel 80 in S10, the parking guidance via voice is started in S12 in case that the storage of the target parking position 85 is completed in S11 or the target parking position 85 is not determined to be stored since pressing on the memory storage key 81 on the touch panel 80 is not recognized in S10. Then, in S13, the moving amount of the vehicle 100 is calculated by obtaining the detected results from the steering angle sensor 4, the rear-right wheel speed sensor 5 and the rear-left wheel speed sensor 6. The moving amount of the vehicle 100 is detected on the plane coordinate as shown in FIG. 8 and obtained by following equations.

$$\theta = \int_0^\alpha \frac{1}{R} \bullet ds \qquad \text{Equation 3}$$

$$X = \int_0^\alpha \sin\theta \cdot ds \qquad \text{Equation 4:}$$

$$Z = \int_0^\alpha \cos\theta \cdot ds \qquad \text{Equation 5:}$$

In the above equations, ds is a small moving distance estimated from a rotation amount of the wheel detected by the rear-right wheel speed sensor 5 and the rear-left wheel speed sensor 6. R is a turning radius of the vehicle 100 estimated by a value of the steering angle sensor 4. a is an accumulated moving distance of the vehicle 100 from the parking start position.

Then, a target steering amount relative to the vehicle path is calculated in S14. Next, a steering actuator is controlled in S15. In S16, it is determined whether or not the vehicle 100 reaches the target parking position. The routine from S13 to S16 is repeatedly performed until the vehicle 100 reaches the target parking position.

At this time, the relation between the image displayed on the display 2 and the parking position by the back-in parking or the parallel parking is shown in FIGS. 11 to 16.

As shown in FIG. 11, for example, when the target parking position 85 is displayed on a lower side relative to the target parking position specified on the image coordinate system, the target parking position 85 is required to upwardly move on the image. In this case, as shown in FIG. 12, the upward indicator 91 on the touch panel 80 is pressed to thereby upwardly move the target parking position 85 to a new position from the former target parking position 85' on the image coordinate system. This upward movement of the target parking position 85 from the former target parking position 85' is conducted on the image coordinate system. In case of the upward movement on the world coordinate system, the vehicle 100 moves to the rearward and leftward direction on the plane of the parking space as shown in FIG. 13. For the actual driving, the target parking position 85 is set at a position where the vehicle 100 reaches by moving in the rearward and leftward direction on the plane.

When the target parking position 85 is instructed to rotate via the rightward rotation indicator 99R and the leftward rotation indicator 99L, the target parking position 85 rotates with respect to a front center position thereof, i.e. a base point 85G as shown in FIG. 14.

The upward movement of the target parking position 85 from the former target parking position 85' corresponds to the upward movement from a base point 85g of the former target parking position 85' to the base point 85G. Thus, the calculation of the movement of the target parking position 85 may be achieved by only calculating the movement of the base point 85G to thereby indicating an overview of the target parking position 85.

In case of the parallel parking as shown in FIG. 15, only the upward indicator 91, the rightward indicator 93, the downward indicator 95, and the leftward indicator 97 are displayed and the upper-rightward indicator 92, the bottom-rightward indicator 94, the bottom-leftward indicator 96, the upper-leftward indicator 98, the rightward rotation indicator 99R, and the leftward rotation indicator 99L are eliminated. When the target parking position 85' is shown on front side relative to the actual target parking position of the parking space on the touch panel 80, the target parking position 85' can be upwardly shifted by pressing the upward indicator 91. In addition, this target parking position 85' is set formally as the target parking position 85 by pressing the upward indicator 91 and the rightward indicator 93. In this case, as shown in FIG. 16, the target parking position 85 is backwardly shifted from the former target parking position 85' to the new target parking position. The backward movement of the target parking position 85 from the former target parking position 85' corresponds to the backward movement of the vehicle 100 on the plane of the parking space on the world coordinate system. For the actual driving, the target parking position 85 is set at a position where the vehicle 100 reaches by moving backward on the plane as shown in FIG. 16.

According to the aforementioned embodiment, the parking assist device includes the image capturing means 60, the parking mode judging means 10, the target parking position inputting means 20, the target parking position storing means 30, the vehicle moving amount detecting means 40, the vehicle path setting means 50, and the displaying means 70.

The parking mode judging means 10 determines whether the parking mode is the back-in parking or the parallel parking. The target parking position inputting means 20 sets the target parking position 85 for parking the vehicle 100 for the vehicle path setting means 50 based on the determination by the parking mode judging means 10. The vehicle path setting means 50 calculates the vehicle path from the present position of the vehicle 100 detected by the vehicle moving amount detecting means 40 to the target parking position 85. At the same time, the displaying means 70 displays the image obtained by the image capturing means 60 that captures the image of an outside in back of the vehicle 100, and also superimposedly displays the vehicle path from the present position of the vehicle 100 to the target parking position 85 calculated by the vehicle path setting means 50 on the image captured by the image capturing means 60 based on the target parking position 85 set by the target parking position inputting means 20. As a result, the vehicle 100 is guided along the vehicle path from the present vehicle position to the target parking position 85. In addition, an automatic driving may be performed as necessary.

In case of the garage at home and the parking space at work, the target parking position 85 is repeatedly set from the identical parking start position. Thus, under such a parking condition, the target parking position 85 is stored in the target parking position storing means 30 beforehand. Then, the stored target parking position 85 is called as necessary to be set for the vehicle path setting means 50. The vehicle path from the present position of the vehicle 100 detected by the vehicle moving amount detecting means 40 to the target parking position 85 is calculated by the vehicle path setting means 50. The image captured by the image capturing means 60 is displayed and also the vehicle path from the present position of the vehicle 100 to the target parking position 85 calculated by the vehicle path setting means 50 is superimposedly displayed on the image captured by the image capturing means 60 based on the target parking position 85 set by the target parking position storing means 30 so as to guide the vehicle 100 along the vehicle path from the present vehicle position to the target parking position 85. In addition, the automatic driving may be performed as necessary.

Accordingly, when the driver operates the shift lever so as to park the vehicle, the image captured by the camera 1 and the target parking position 85 are both displayed on the screen of the display 2 in the vehicle. A shape and a size of the target parking position 85 are calculated, being substantially same as the vehicle 100 on the world coordinate system on the image of the display 2. When the target parking position is superimposedly displayed on the image captured by the camera 1, the display position of the target parking position is calculated by the projection conversion from the world coordinate system to the image coordinate system. The target parking position 85 is set by moving the initial value or called target parking position 85 via the indicators on the screen of the touch panel 80 to match with the actual parking space.

Therefore, the target parking position 85 may be called depending on the back-in parking or the parallel parking. Especially in case of parking from the identical parking start position, the past target parking position 85 may be called to thereby decrease number of operations of the parking assist device. Then, the usability thereof may be improved.

Especially, the target parking position storing means 30 includes a plurality of storage areas for the target parking position 85 so as to store the target parking position 85 in the selective storage area and also selectively call the stored target parking position 85 as necessary. Thus, in the parking condition with the identical parking start position and the target parking position 85 such as in the garage at home and the parking space at work, or in the parking condition with a plurality of target parking positions stored beforehand such as in a supermarket, the stored target parking position 85 is selectively called in accordance with the selected target parking position 85, thereby decreasing number of operations of the parking assist device. The usability thereof may be increased.

According to the aforementioned embodiment, the target parking position 85 stored in the nonvolatile memory 3A may acquire a setting value with high probability by learning within a predetermined range based on probability distribution. Thus, the target parking position 85 may be set meeting with the driving habit of the driver.

In addition, according to the aforementioned embodiment, the parking assist device causes the vehicle to be automatically driven by calculating the target steering angle amount relative to the vehicle path in S14, controlling the steering actuator in S15, and determining whether the vehicle reaches the target parking position in S16. However, the present embodiment may be achieved by the image guide only, the combination of the voice guide and the image guide, or the combination of the voice guide and the image guide, and the automatic driving control.

According to the parking assist device of the aforementioned embodiment, the target parking position 85 stored in the target parking position storing means 30 is set for the target parking position setting means 50 in the same way as the target parking position input means 20. However, the present embodiment may be achieved without the target parking position storing means 30.

According to the aforementioned embodiment, the vehicle moving amount detecting means 40 detects the movement of the vehicle 100 for determining the vehicle path from the present position to the target parking position and used to determine whether or not the vehicle in motion is in an appropriate position. Thus, it is desirable for the vehicle moving amount detecting means 40 to detect a precise position of a steering wheel and wheels of the vehicle. Basically, at least the wheel speed sensor arranged at the wheel is desired.

Further, according to the aforementioned embodiment, the vehicle path setting means 50 normally calculates the vehicle path from the present position of the vehicle 100 to the target parking position by a microcomputer. However, at least a calculation circuit that can calculate the vehicle path from the present position to the target parking position may be used and thus the vehicle path setting means 50 is not limited to be realized by the microcomputer.

Furthermore, the vehicle moving amount detecting means 40 and the vehicle path setting means 50 may be eliminated and only the target parking position 85 may be displayed.

Furthermore, according to the aforementioned embodiment, the image capturing means 60 is only required to have ability for capturing the image of the outside area in back of the vehicle. Therefore, either of wide-angle lens or standard lens may be used. In general, the CCD camera with the standard lens may be used for the image capturing means 60. In case of the wide-angle lens being used, correction thereof is required.

Furthermore, according to the aforementioned embodiment, the parking mode judging means 10 may determine the back-in parking or the parallel parking as the parking mode by an artificial input such as a stick operation, a key operation and a touch operation on the screen.

Furthermore, according to the aforementioned embodiment, the target parking position inputting means 20 may indicate the target parking position at an instructed position in accordance with the parking mode, i.e. the back-in parking and the parallel parking determined by the parking mode judging means 10 and modify the target parking position via the stick operation, the key operation, the touch operation on the screen and the like.

Furthermore, according to the aforementioned embodiment, a liquid crystal display (LCD), EL display, and the like are used for the displaying means 70. Precisely, the displaying means 70 is only required to have functions of displaying the image captured by the normal image capturing means 60 and superimposedly displaying the vehicle path from the present vehicle position to the target parking position calculated by the vehicle path setting means 50 on the captured image based on the target parking position set by the target parking position inputting means 20. That is, the vehicle path from the present vehicle position to the target parking position may be obtained by drawing a line on a transparent background, which may be superimposedly displayed on the captured image.

Furthermore, according to the aforementioned embodiment, the target parking position storing means 30 may store one or more of target parking positions via the stick operation, the key operation, the touch operation on the screen and the like. In addition, the stored parking position may be selectively called via the stick operation, the key operation, the touch operation on the screen and the like. The stored target parking position can be again stored (i.e. renewal storage).

Furthermore, according to the aforementioned embodiment, the target parking position storing means stores the target parking position as an equation or a figure, and also stores the information whether the parking mode is the parallel parking or the back-in parking via the information such as the flag. Thus, the target parking position storing means 30 can precisely determines the parking mode for the information stored in the past.

Furthermore, according to the aforementioned embodiment, it is determined whether the vehicle reverses for the back-in parking or the parallel parking and then the initial target parking position can be set depending on the determined parking mode when setting the target parking position by the target parking position inputting means 20. Thus, at least the rotational movement for changing from the parallel parking to the back-in parking or vice versa is not required, thereby achieving the intuitive operation of the driver and simple moving operation of the target parking position.

Furthermore, according to the aforementioned embodiment, the target parking position storing means 30 can also determine the back-in parking or the parallel parking based on the information selectively called. That is, when the target parking position is stored by the target parking position storing means 30, the information of whether the parking mode is the back-in parking or the parallel parking is also stored, which can be used as a function of the parking mode judging means.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle backward movement assist device comprising:
   an image capturing means for capturing an image of an outside area in back of a vehicle;
   a parking mode judging means for judging whether a parking mode by reversing of the vehicle is a back-in parking or a parallel parking, the parking mode judging means determines that the parking mode is the parallel parking when a deflection angle of a running path of the vehicle is equal to or smaller than a predetermined threshold value within a predetermined distance or a predetermined time before a shift lever is positioned in a reverse range;
   a target parking position inputting means for setting a target parking position where the vehicle is parked based on the parking mode determined by the parking mode judging means; and
   a displaying means for displaying the image captured by the image capturing means and superimposedly displaying the target parking position set by the target parking position inputting means on the captured image so as to guide the vehicle to the target parking position.

2. A vehicle backward movement assist device according to claim 1, wherein when the parking mode is determined to be the back-in parking by the parking mode judging means, a display of the target parking position on the displaying means is moved on an image coordinate system by the target parking position inputting means and when the parking mode is determined to be the parallel parking by the parking mode judging means, the display of the target parking position on the displaying means is moved on a world coordinate system by the target parking position inputting means.

3. A vehicle backward movement assist device according to claim 2, wherein the target parking position inputting means moves the display of the target parking position on the displaying means in a direction of a single coordinate axis out of coordinate axes constituting the image coordinate system in case of the back-in parking being performed, and moves the display of the target parking position on the displaying means in the direction of the single coordinate axis out of the coordinate axes constituting the world coordinate system in case of the parallel parking being performed.

4. A vehicle backward movement assist device according to claim 2, wherein when the parking mode is determined to be the back-in parking by the parking mode judging means and the target parking position is moved in parallel on the displaying means, the display of the target parking position on the displaying means is moved on the image coordinate system by the target parking position inputting means.

5. A vehicle backward movement assist device according to claim 1, wherein when the parking mode is determined to be the parallel parking by the parking mode judging means, the target parking position is moved on a world coordinate system to be set as an actual target parking position which is converted into an image on an image coordinate system so as to be displayed on the displaying means and when the parking mode is determined to be the back-in parking by the parking mode judging means, the target parking position is moved on the image coordinate system and set as the actual target parking position on the world coordinate system which is converted into an image on the image coordinate system so as to be displayed on the displaying means.

6. A vehicle backward movement assist device comprising: an image capturing means for capturing an image of an outside area in back of vehicle;
 a parking mode judging means for judging whether a parking mode by reversing of the vehicle is a back-in parking or a parallel parking, the parking mode judging means determines that the parking mode is the parallel parking when a deflection angle of a running path of the vehicle is equal to or smaller than a predetermined threshold value within a predetermined distance or a predetermined time before a shift lever is positioned in a reverse range;
 a target parking position inputting means for setting a target parking position where the vehicle is parked based on the parking mode determined by the parking mode judging means;
 a target parking position storing means including one or more storage areas for a target parking position information for storing the target parking position in a selected storage area and for selectively calling the stored target parking position to set as the target parking position at that time; and
 a displaying means for displaying the image captured by the image capturing means and superimposedly displaying the target parking position set by the target parking position inputting means or the target parking position storing means on the captured image so as to guide the vehicle to the target parking position.

7. A vehicle backward movement assist device according to claim 6, wherein when the parking mode is determined to be the back-in parking by the parking mode judging means, a display of the target parking position on the displaying means is moved on an image coordinate system by the target parking position inputting means and when the parking mode is determined to be the parallel parking by the parking mode judging means, the display of the target parking position on the displaying means is moved on a world coordinate system by the target parking position inputting means.

8. A vehicle backward movement assist device according to claim 7, wherein the target parking position inputting means moves the display of the target parking position on the displaying means in a direction of a single coordinate axis out of coordinate axes constituting the image coordinate system in case of the back-in parking being performed, and moves the display of the target parking position on the displaying means in the direction of the single coordinate axis out of the coordinate axes constituting the world coordinate system in case of the parallel parking being performed.

9. A vehicle backward movement assist device according to claim 7, wherein when the parking mode is determined to be the back-in parking by the parking mode judging means and the target parking position is moved in parallel on the displaying means, the display of the target parking position on the displaying means is moved on the image coordinate system by the target parking position inputting means.

10. A vehicle backward movement assist device according to claim 6, wherein when the parking mode is determined to be the parallel parking by the parking mode judging means, the target parking position is moved on a world coordinate system to be set as an actual target parking position which is converted into an image on an image coordinate system so as to be displayed on the displaying means and when the parking mode is determined to be the back-in parking by the parking mode judging means, the target parking position is moved on the image coordinate system and set as the actual target parking position on the world coordinate system which is converted into an image on the image coordinate system so as to be displayed on the displaying means.

11. A vehicle backward movement assist device according to claim 10, wherein the target parking position storing means stores the target parking position as an equation or a figure and also stores an information of whether the parking mode is the parallel parking or the back-in parking.

* * * * *